United States Patent [19]

Carrieri

[11] 4,015,620

[45] Apr. 5, 1977

[54] HIGH RESPONSE UNLOADING VALVE

[75] Inventor: Louis F. Carrieri, LaGrange Park, Ill.

[73] Assignee: Gulf & Western Manufacturing Company, Southfield, Mich.

[22] Filed: Oct. 11, 1974

[21] Appl. No.: 514,106

[52] U.S. Cl. ........................................ 137/115

[51] Int. Cl.$^{2}$ ........................................ F16K 11/00

[58] Field of Search ............ 137/98, 111, 115, 114; 192/150

[56] References Cited

UNITED STATES PATENTS

| | | | |
|---|---|---|---|
| 1,407,844 | 2/1922 | Dewey | 137/111 |
| 2,581,855 | 1/1952 | Griffith | 137/98 |
| 2,937,733 | 5/1960 | Danly | 192/150 |
| 3,248,985 | 5/1966 | Hitchcock et al. | 192/150 X |

*Primary Examiner*—William R. Cline

*Attorney, Agent, or Firm*—Meyer, Tilberry & Body

[57] ABSTRACT

A high response relief or unloading valve is disclosed for use in a pressurized hydraulic system. The valve includes a housing supporting a reciprocable spool valve element having opposite ends cooperable with separate fluid receiving chambers in the housing and which chambers receive fluid at a given system pressure. The valve includes a common discharge passage for the chambers and to which one of the chambers is opened before the other and in response to fluid pressure in the other chamber exceeding the given system pressure. Movement of the spool element in the opening direction is accelerated by the decrease in fluid bias in the one chamber and the excess pressure in the other chamber, and the spool element is structured for the opening movement thereof to be decelerated following release of the fluid at excess pressure from the other chamber.

13 Claims, 8 Drawing Figures

FIG. 3
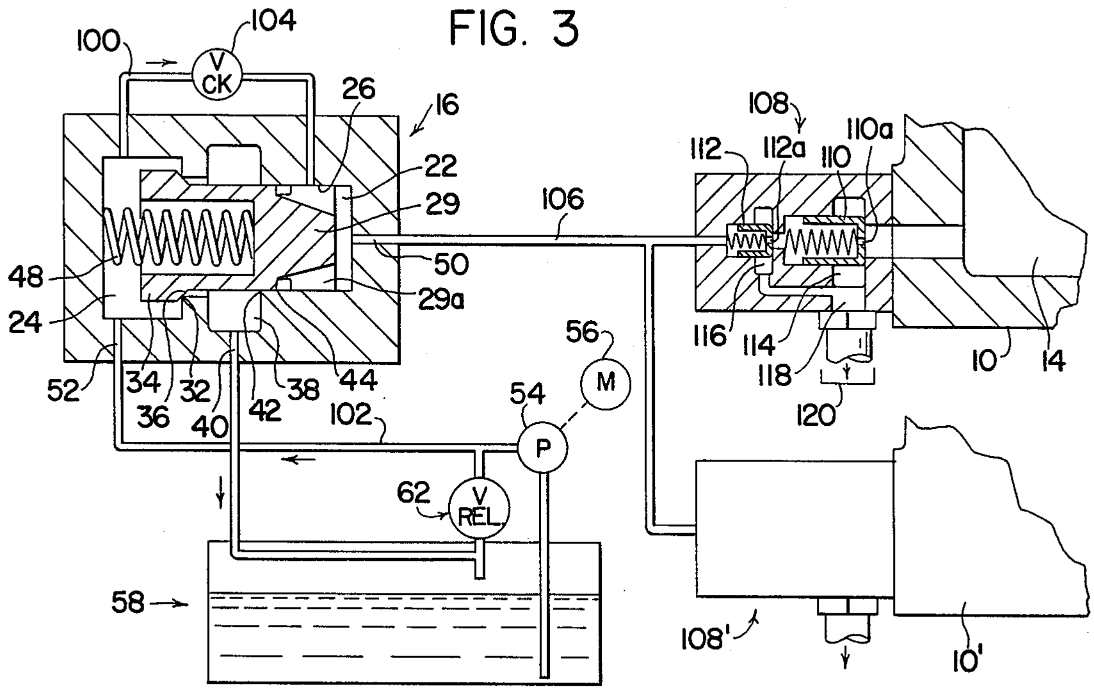
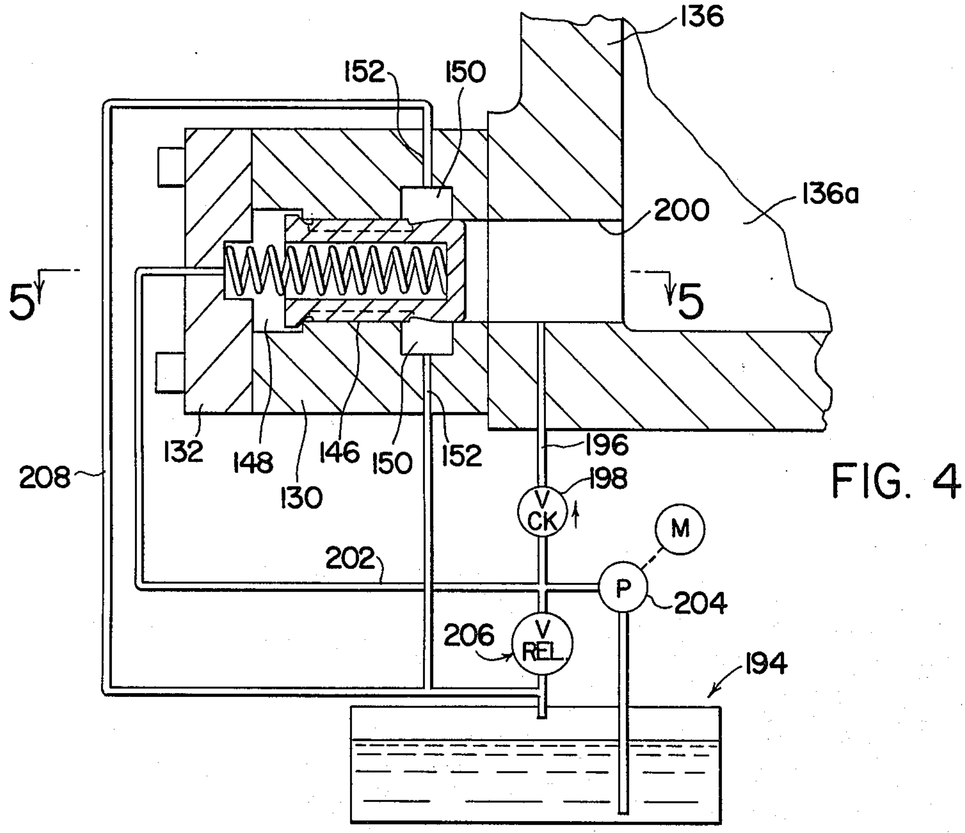
FIG. 4

HIGH RESPONSE UNLOADING VALVE

The present invention relates to the art of fluid flow control devices and, more particularly, to a fluid pressure actuated relief valve.

The relief valve of the present invention finds particular utility in a hydraulic overload protection system for a mechanical press and by which system the press is protected from damage due to an overload during operation thereof. Accordingly, the valve will be described in detail in conjunction with such use, but it will be appreciated that the valve is operable in conjunction with other hydraulic systems or control circuits in which high response to a hydraulic presure overload condition is desired.

In operation of mechanical presses, it is not an unusual occurrence for a press to be subjected to an overload condition such as where, for example, tools or the like are inadvertently left in the press. In the absence of an overload relief system, costly damage to the press can result. Accordingly, presses are often provided with hydraulic overload protection devices which include a hydraulic cylinder and piston assembly incorporated in the bed of the press, a hydraulic fluid supply system therefor, and a relief valve arrangement in the hydraulic system to vent the overload cylinder chamber in the event of an overload on the press which increases the pressure of fluid in the latter chamber. Generally, the relief valve arrangement includes a pressure responsive relief valve operable to dump system fluid to a collecting tank or the like upon the occurrence of an overload condition on the press.

Many pressure responsive relief valves have been provided heretofore for relieving excess pressure in a hydraulic system such as by dumping fluid from the system upon the occurrence of an undesirable pressure condition therein. Often, such relief valves include a constant closing force such as that defined, for example, by a biasing spring relied upon alone to normally maintain the valve closed. Valves of the latter character open in response to fluid pressure acting against the valve element thereof to produce an opening force exceeding the spring force. Such constant closing force valves, however, have a tendency to modulate during operation thereof, especially where or when the pressure of the opening fluid just slightly exceeds the closing force of the spring. Moreover, the constant closing force provides for the relief valve to have a slow response time, whereby, in connection with a press protection system for example, the press may be damaged before the valve opens sufficiently to dump system fluid in response to an overload condition.

Still further, the force which can be developed to accelerate opening movement of the valve element in previous relief valve arrangements is determined by the difference in the actual pressure of fluid resulting from the overload and the set point pressure at which the valve is to open. If the closing force on the valve is constant and is not reduced prior to or during opening movement of the valve element, very little acceleration is realized. Such a condition of minimum acceleration results in increasing the time required for the valve to fully open and quickly dump system fluid.

Other relief valve arrangements heretofore provided have included systems employing fluid pressure to bias the valve closed, together with a solenoid actuated valve to vent the biasing fluid in response to an overload condition. However, the solenoid valve must be first actuated by a signal from a pressure switch or transducer in the system, and the fluid providing the closing force must then be released. Such a valve arrangement generally has a response time in the order of 15 to 30 milliseconds, and such a response time is not adequate when it is considered that a response time of 2 milliseconds or less may be required to fully protect a device such as a high speed press. Moreover, such valve arrangements in requiring both a relief valve and a solenoid operated valve in combination therewith are undesirable large in structure, are expensive, and increase maintenance costs for the system in which they are incorporated.

Other relief valves, such as spring biased constant closing force designs, are likewise quite large and lack versatility for use in systems having different fluid pressure characteristics. Accordingly, different sized valves are required to satisfy different fluid system pressure requirements.

In accordance with the present invention, an improved fluid pressure actuated relief or dumping valve is provided by which the foregoing disadvantages, and others, are overcome or minimized. More particularly, the relief valve of the present invention is structurally simple and compact, thus minimizing the cost thereof, is versatile in use in that one size valve can be employed in hydraulic fluid systems having different pressure requirements. Moreover, the valve of the present invention is structured to minimize response time upon the occurrence of a pressure overload condition. With regard to the latter, the valve is a self-contained unit normally closed primarily by fluid pressure and operable, in response to an overload pressure, to exhaust the holding fluid and accelerate opening movement to minimize the time required to dump the system fluid in response to the overload condition.

In accordance with a preferred embodiment, the relief valve includes a double ended reciprocable spool element displaceable in one direction to close first and second fluid receiving chambers at the corresponding ends thereof and in the other direction to open the chambers to a common discharge chamber therebetween. The first chamber is adapted to receive fluid at a given system pressure, and the corresponding end of the spool is provided with a valve element engaging a valve seat such that movement of the valve element away from the seat immediately opens the chamber with respect to the discharge chamber. Fluid in the first chamber at system pressure biases the spool valve in the closing direction together with a biasing spring. The fluid in the first chamber provides the primary biasing force to close the valve.

The second chamber of the valve is also adapted, under normal conditions, to receive hydraulic fluid at the given system pressure. The corresponding end of the spool is provided with a cylindrical head slidably engaging the chamber wall in a manner whereby a predetermined extent of axial displacement of the spool is required to open the second chamber to the discharge chamber. Preferably, the effective area of the end of the spool disposed in the first chamber is larger than the effective area of the end of the spool in the second chamber, whereby the pressure of fluid in the first chamber applies a closing force on the spool slightly greater than the biasing force on the end of the spool in the second chamber tending to open the valve.

When the valve is used in a system to dump fluid therefrom upon the occurrence of a fluid pressure in the system above the given pressure, fluid at the increased pressure is prevented from entering the first chamber and is applied only to the second chamber. The increased pressure displaces the spool in the opening direction, and the first chamber opens with respect to the discharge chamber to dump the holding fluid. This minimizes the closing force, and the fluid pressure in the second chamber together with the reduction in holding force causes accelerated movement of the spool in the opening direction to open the second chamber with respect to the discharge passage and dump fluid column therebehind. Thus, the entire system pressure is quickly released in response to a pressure overload condition.

In accordance with another aspect of the invention, the spool element is structured at one end thereof to be cooperable with the discharge passageway in the valve housing to decelerate opening movement of the spool element after the second chamber opens and as the spool approaches the full extent of opening displacement. This advantageously minimizes wear and possible damage to the spool and valve housing resulting from impact therebetween during opening movement.

It is accordingly an outstanding object of the present invention to provide an improved fluid pressure actuated relief or dumping valve.

It is another object to provide a self-contained valve of the foregoing character structured to minimize response time to an overload fluid pressure applied thereto.

Yet another object is the provision of a valve of the foregoing character which is normally closed primarily by a system fluid at a given pressure acting on one side of a fluid actuated element of the valve and which is responsive to an excess fluid pressure in the system acting on the opposite side of the element to release the holding fluid and accelerate full opening of the valve.

A further object is the provision of a relief valve of the foregoing character in which the opposite ends of a reciprocable spool valve element respectively close and open a first chamber for the holding fluid and a second chamber adapted to receive an overload pressure, and in which the spool element is operable to delay opening of the second chamber until the first chamber opens to release the holding fluid.

Still a further object is the provision of a relief valve of the foregoing character wherein the spool element is structured for cooperation with a passage in the valve housing to decelerate opening movement of the spool.

Yet a further object is the provision of a relief valve having a minimum response time and which is self-contained, structurally compact, comprised of a minimum number of parts and is operable in hydraulic fluid systems having different pressure characteristics, whereby the valve is economical to produce and maintain, is versatile and is highly efficient in operation.

The foregoing objects, and others, will in part be obvious and in part will be pointed out more fully hereinafter in conjunction with the description of preferred embodiments illustrated in the accompanying drawings in which:

FIG. 3 is a schematic illustration of another press overload protection system including a relief valve in accordance with the present invention;

FIG. 4 is a sectional elevation view of a preferred relief valve made in accordance with the present invention and shown in association with a press overload protection system;

Figure 1:
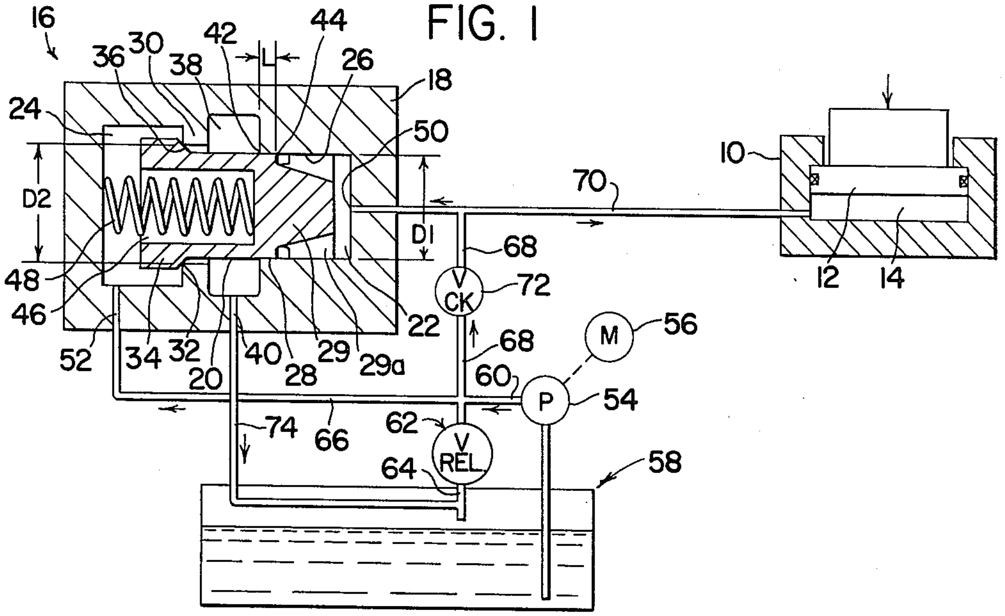
FIG. 1 is a schematic illustration of a press overload protection system including a high response relief valve in accordance with the present invention.

Referring now in greater detail to the drawings wherein the showings are for the purpose of illustrating preferred embodiments of the invention only and not for the purpose of limiting the invention, FIG. 1 shows a press overload protection system including an overload cylinder 10 and an associated overload piston 12 which, in a well known manner, are operatively mounted on a press so as to be actuated in response to an overload on the press. Cylinder 10 and piston 12 cooperatively define a fluid receiving chamber 14 and, in response to a press overload, piston 12 is displaced relative to cylinder 10 to reduce the volume of chamber 14 and thus pressurize the fluid therein.

The overload protection system further includes a fluid pressure actuated relief or unloading valve 16 comprised of a valve housing 18 having a cylindrical spool valve component 20 reciprocably supported therein. Housing 18 is provided with a first fluid receiving chamber 22 at one end thereof and a second fluid receiving chamber 24 coaxial with and axially spaced from chamber 22. Chamber 22 includes a cylindrical wall 26 slidably receiving the corresponding end of spool 20. The latter end of the spool includes a cylindrical peripheral surface 28 having a close fit with cylindrical wall 26 to seal against the leakage of fluid therebetween. Cylindrical wall 26 and spool surface 28 cooperate to define a valve seat and valve element for opening and closing chamber 22, as set forth more fully hereinafter. Chamber 24 includes a cylindrical radially inwardly extending wall 30 having a cylindrical edge 32, and the corresponding end of spool 20 is provided with a radially outwardly projecting flange 34 provided with a chamfered surface 36 adapted to engage edge 32. Edge 32 and surface 36 cooperably define a valve seat and valve element face for opening and closing chamber 24, as set forth more fully hereinafter. Body 18 is provided with a discharge passage 38 axially between chambers 22 and 24 and extending about the intermediate portion of spool 20. Passage 38 is provided with an outlet port 40 opening radially through housing 18.

The end of spool 20 disposed in chamber 22 behind spool surface 28 includes a generally frusto-conical portion 29 having a major cross-sectional dimension less than the diameter of surface 28. A plurality of circumferentially narrow guide members **29*a* extend radially from portion 29 and slidably engage chamber surface 26 to support and guide reciprocating movement of spool 20** in the valve housing.

Discharge passage 38 intersects with cylindrical wall 26 of chamber 22 to define a cylindrical edge 42. When the relief valve is closed as shown in FIG. 1, cylindrical surface 28 of the spool has an axial length L between edge 42 and spool edge 44 which defines the extent of axial movement of the spool required to open chamber 22 with respect to discharge passage 38.

Spool 20 is provided with an axial recess 46 opening thereinto from the end of the spool disposed in chamber 24. A biasing spring 48 has its inner end disposed in recess 46 and its outer end in abutting engagement with a wall of chamber 24 so as to bias spool 20 in the direction to close the relief valve. Housing 18 further includes an inlet passage 50 opening into chamber 22 and inlet passage 52 opening into chamber 24.

The overload protection system further includes a pump 54 driven by a suitable motor 56 to deliver hydraulic fluid to the system from a suitable source 58 and to charge the system to a predetermined given pressure. In the embodiment shown, the outlet of pump 54 is connected to the system through a feed line 60 and a relief valve assembly 62 which is operable under normal conditions to maintain the system at the given pressure. In this respect, in response to an increase in system pressure, other than that caused by a press overload, relief valve 62 opens to discharge system fluid to a line 64 from which the fluid is returned to source 58.

Hydraulic fluid at the given system pressure is delivered to inlet passage 52 and chamber 24 of valve 16 through a flow line 66, and to inlet passage 50 and chamber 22 of the valve and pressure chamber 14 of the overload cylinder and piston assembly through a flow line 68 and a flow line 70 communicating with line 68. A one way check valve 72 is provided in line 68 between the point of communication of line 70 therewith and the point of communication of line 68 with pump line 60 and line 66. Accordingly, it will be appreciated that fluid at system pressure is free to flow past valve 72 in the direction toward valve chamber 22 and overload cylinder chamber 14 and that valve 72 prevents flow of system fluid from the latter chambers into valve chamber 24, relief valve 62 or pump 54.

In operation of the overload protection arrangement described above, pump 54 delivers hydraulic fluid at the predetermined system pressure to chambers 22 and 24 of valve 16 and to chamber 14 between cylinder 10 and piston 12. Accordingly, all three chambers normally contain system fluid at the given system pressure. Fluid at system pressure in chamber 24 together with the biasing force of spring 48 maintains relief valve 16 in the closed position thereof as shown in FIG. 1. Moreover, the end of spool 20 disposed in chamber 24 has an effective pressure receiving surface the diameter of which corresponds to the diameter of seat edge 32 which is designated D2 in FIG. 1. Further, the end of spool 20 disposed in chamber 22 has a pressure receiving surface the diameter of which corresponds to the diameter of cylindrical wall 26 of the chamber as designated D1 in FIG. 1. Preferably, diameter D2 is greater than D1. Accordingly, fluid in chamber 24 at a given system pressure exerts a greater biasing force to close the valve than the biasing force of the fluid at system pressure in chamber 22. This enables minimizing the closing force of spring 48 on the spool to an amount just sufficient to close the valve in the absence of fluid under pressure in chambers 22 and 24.

In the event of an overload on the press, piston 12 is displaced so as to reduce the volume of chamber 14 and this pressurizes the fluid in the system between chambers 14 and 22 through line 70 and that portion of line 68 between line 70 and check valve 72. Accordingly, fluid in this portion of the system is now at a pressure in excess of the given system pressure, and valve 72 prevents the transmission of fluid at the excess pressure to chamber 24 of valve 16. The increase in fluid pressure in chamber 22 of valve 16 displaces spool 20 in the direction to open chambers 22 and 24 with respect to discharge passage 38. In response to such movement, valve element surface 36 immediately disengages from valve seat edge 32 to open chamber 24 to discharge passage 38, whereby system fluid in chamber 24 and therebehind is immediately discharged from chamber 24 into discharge passage 38 and discharge flow line 74 leading back to source 58.

The initial opening of chamber 24 to discharge passage 38 precedes movement of spool 20 the distance L required to open chamber 22 to the discharge passage. Accordingly, the pressure in chamber 22 is still at an excess pressure with respect to the given system pressure at the time chamber 24 initially opens. This condition provides for the excess pressure in chamber 22 upon initial opening of chamber 24 to accelerate displacement of spool 20 in the opening direction. In this respect, the closing force is minimized substantially to that of spring 48 by the immediate discharge of fluid from the chamber 24. When edge 44 of spool 20 passes chamber edge 42, chamber 22 is then open to discharge passage 38 to release the fluid column between the press and chamber 22. It will be appreciated that outlet port 40 and flow lines 70 and 74 are sufficiently large for fluid flow therethrough to be unrestricted during operation of the valve to dump system fluid.

Following opening of relief valve 16 in the foregoing manner and the release of system fluid, pump 54 is operable to recharge the system, and system fluid in chamber 24 together with spring 48 return the relief valve to the closed position. It will be appreciated that suitable controls, not shown, can be employed to stop or otherwise control the press in response to the overload condition and to disengage pump motor 56 until such time as the condition causing the overload is corrected.

Figure 2:
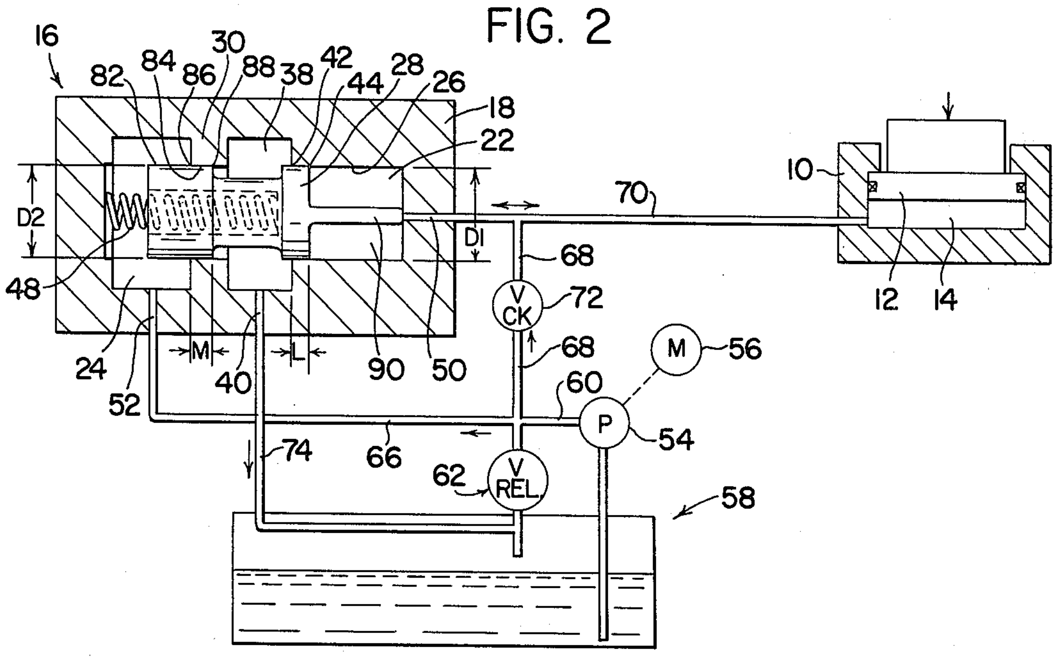
FIG. 2 is a schematic illustration of a press overload protection system including a modification of the relief valve shown in FIG. 1.

In the overload protection system shown in FIG. 2, a modification of the relief valve is disclosed which basically differs from that shown in FIG. 1 only in the construction of the spool element of the relief valve. Accordingly, like numerals are employed in FIG. 2 to designate components corresponding to those shown in FIG. 1. In FIG. 2, the valve spool 80 is structurally different from valve spool 20 shown in FIG. 1 primarily in that the end of the valve spool disposed in chamber 24 has a cylindrical outer surface 72 slidably engaging cylindrical inner surface 84 of wall 30. Further, surface 84 of wall 30 has a circular edge 86, and cylindrical surface 82 of the spool has a circular edge 88 axially spaced from edge 86 toward discharge chamber 38 when the valve is in the closed position as shown in FIG. 2.

The end of spool 80 disposed in chamber 22 includes a cylindrical outer surface 28 and a cylindrical edge 44 as in the embodiment shown in FIG. 1. In the embodiment of FIG. 2, however, the remaining portion of the end of the spool disposed in chamber 22 is defined by a plurality of circumferentially narrow radially extending guide members 90 having an axial extent providing for engagement thereof with the end wall of the chamber to limit movement of spool 80 in the closing direction. As in the embodiment of FIG. 1, the guide members support and guide reciprocating movement of the spool.

When the relief valve is in the closed position as shown in FIG. 2, spool edge 44 is axially spaced from edge 42 of the opening to discharge passage 38 a distance L, and spool edge 88 is axially spaced from edge 86 of wall 30 a distance M. The overlap represented by distance L and M prevent pressure loss to line 74 through discharge passage 38 and outlet port 40.

The ends of spool 80 in chambers 22 and 24 have corresponding pressure receiving faces the areas of which are determined by the corresponding diameters of the cylindrical surfaces 28 and 82 designated D1 and D2, respectively. Accordingly, the closing force on the spool element to maintain the relief valve closed can be provided either by valve spring 48 alone, for valves in which dimension D1 equals dimension D2, or by the valve spring together with system pressure acting on the difference in areas of the pressure receiving surfaces where the dimension D2 is greater than the dimension D1.

Response and operation of the valve shown in FIG. 2 to a press overload corresponds to that described hereinabove in connection with the embodiment of FIG. 1. In this respect, excess pressure in chamber 22 displaces spool 80 in the opening direction. When spool edge 88 passes edge 86 of wall 30, chamber 24 opens to discharge passage 38 and the spool thereafter is accelerated in the opening direction by the fluid pressure in chamber 22. Due to the axial overlap of cylindrical surface 82 and surface 84 of wall 30, chamber 24 will not immediately open as in the embodiment of FIG. 1. Accordingly, response time may be slightly increased with the arrangement shown in FIG. 2, but in any event the release of fluid at system pressure from chamber 24 is immediately followed by acceleration of the spool due to the fluid in chamber 22 at a pressure exceeding the given system pressure. It is essential in accordance with the present invention that chamber 24 open either before or simultaneously with the opening of chamber 22. Accordingly, axial length M must be equal to or less than axial length L. It will be appreciated therefore that response time is reduced as dimension M diminishes relative to dimension L.

FIG. 3 shows the operation of a relief valve of the present invention with another embodiment of a press overload protection system. Certain components of the system shown in FIG. 3 correspond to those shown in FIG. 1, and like numerals appear in these Figures to designate corresponding components. In the embodiment of FIG. 3, hydraulic fluid from source 58 is delivered to the components of the system through relief valve 16 and a bypass line 100 between chambers 22 and 24. More particularly, fluid from source 58 is delivered to chamber 24 through line 102, thence to chamber 22 through bypass line 100 and check valve 104 therein, and thence to chamber 14 of the overload cylinder and piston device through a feed line 106 and a multiple stage poppet valve assembly 108. Check valve 104 permits the flow of fluid at system pressure in the direction from chamber 24 toward chamber 22 and prevents fluid flow in the opposite direction, whereby fluid in chamber 24 is maintained at system pressure in the embodiment of FIG. 1 when a fluid pressure indicative of press overload is transmitted to relief valve 16.

Poppet valve assembly 108 is suitably mounted on overload cylinder 10 for communication with chamber 14 and includes primary and secondary spring biased valve elements 110 and 112, respectively. Valve elements 110 and 112 are normally closed and, in the embodiment shown, are provided with apertures **110*a* and 112*a* which permit flow of system fluid therethrough into chamber 14 such that the normal pressure of fluid in chamber 14 is the given pressure to which the system is charged by pump 54 and pressure controlling relief valve 62**.

Poppet valve elements 110 and 112 are associated with corresponding discharge chambers 114 and 116, and the latter discharge chambers communicate with a common discharge passage 118 leading to a discharge line 120 which may, for example, provide for fluid discharge thereinto to flow back to source 58. The poppet valve assembly operates as the discharge valve for fluid in chamber 14 and as a pressure amplifier for fluid in the system between chamber 22 and the poppet valve assembly. In this respect, an overload on the press which reduces the volume of chamber 14 pressurizes the fluid therein to a pressure in excess of the given system pressure, and valve elements 110 and 112 open to discharge fluid therebetween and fluid in chamber 14 to discharge passage 118 and line 120. Simultaneously, the displacement of valve elements 110 and 112 causes an increase in the pressure of fluid in line 106 and chamber 22 of relief valve 16. The increased pressure in chamber 22 actuates valve spool 20 in the manner described hereinabove in connection with the embodiment of FIG. 1 to achieve opening of chamber 24 to discharge passage 38 and thence acceleration of the spool in the opening direction to open chamber 22 to discharge passage 38.

It will be appreciated, therefore, that the pressure in chamber 22 and line 106 is quickly relieved to receive the fluid pressure closing bias on poppet valve elements 110 and 112, allowing the latter to fully open and remain open with minimum closing bias during the exhaust of fluid in chamber 14 to discharge line 120.

While a two stage poppet valve arrangement is shown in the embodiment of FIG. 3, the intended fluid discharge and fluid pressure amplification functions can be achieved with a single stage arrangement. The use of a poppet valve arrangement in the overload protection system also enables the system to operate with a pressure in overload cylinder chamber 14 which is less than the given system pressure in relief valve chambers 22 and 24. In this respect, for example, aperture **110*a* in poppet valve element 110 can be eliminated to close off flow communication between chamber 14 and line 106, and chamber 14 can be charged through a source of supply independent of source 58 to a given pressure. Chambers 22 and 24 of relief valve 16 and line 106 are charged by pump 54 to a system pressure above that of the pressure in chamber 14. Upon an overload on the press the pressure in chamber 14 is sufficiently increased above the given level thereof and poppet valve elements 110 and 112 are displaced to open chamber 14 to discharge passage 118 and to increase the pressure of fluid in line 106 and chamber 22 to cause actuation of relief valve 16** in the manner hereinabove described.

As is well know in the press art, a given press may be provided with one, two or four overload cylinder and piston devices and, as shown in FIG. 3, such an additional overload device including a cylinder 10' can be connected to feed line 106 through a corresponding poppet valve assembly 108'. The system is operable through a single relief valve 16 to dump fluid simultaneously from the plurality of overload devices in the manner described hereinabove. While the plurality of overload devices and valve 16 are shown in FIG. 3 in association with poppet valve arrangements, it will be appreciated that valves 16 in the systems shown in FIGS. 1 and 2 are likewise operable in connection with dumping a plurality of overload devices directly connected in fluid flow communication therewith.

In FIGS. 4–8 of the drawing there is shown a preferred structure for a relief valve according to the present invention. The preferred valve is shown generally in FIG. 4 in association with a press overload device and is shown in detail in FIGS. 5–8. Referring to FIGS. 4–8, the relief valve includes a housing comprised of a body member 130 and an end plate member 132. End plate member 132 is attached to body 130 by means of a plurality of threaded fasteners 134, and the valve housing is mountable on the overload cylinder 136 of a press by means of a plurality of bolts 138. The facial juncture between body member 130 and end plate member 132 is suitably sealed against fluid leakage therebetween such as by means of an O-ring seal 140, and the facial engagement between body member 130 and overload cylinder 136 is similarly sealed such as by means of an O-ring seal 142.

Body member 130 is provided with an axial bore therethrough including a cylindrical intermediate portion 144 which receives and slidably supports a reciprocable spool component 146 as described more fully hereinafter. The bore through body member 130 is radially enlarged at one end of intermediate portion 144 to define a cylindrical fluid receiving chamber 148 with end plate member 132. The bore is also radially enlarged at the other end of intermediate portion 144 to provide a discharge chamber 150 surrounding spool member 146, and diametrically opposed discharge ports 152 extend radially through body member 130 and open into discharge chamber 150. The juncture between cylindrical intermediate portion 144 of the bore and chamber 148 is chamfered to define an annular valve seat 154, and the juncture between intermediate portion 144 and discharge chamber 150 defines a cylindrical edge 156. The bore through body member 130 further includes a cylindrical portion 158 of uniform diameter opening into discharge chamber 150 from the end of the body member facing overload cylinder 136.

Spool member 146 is provided at one end with a radially outwardly extending valve element portion 160 which is disposed in chamber 148 and which is provided with a chamfered surface 162 adapted to matingly engage valve seat surface 154 to close member 148 with respect to discharge chamber 150. Further, spool member 146 is provided with an axial bore 164 opening thereinto from end face 166 of valve element portion 160, and end plate member 132 is provided with an axially extending bore 168 which is aligned with bore 164. A biasing spring 170 has its opposite ends disposed in bores 164 and 168 and serves to bias spool member 146 in the direction of closure. End plate member 132 is provided with a fluid inlet opening 172 through which system fluid is delivered to chamber 148.

Figure 5:
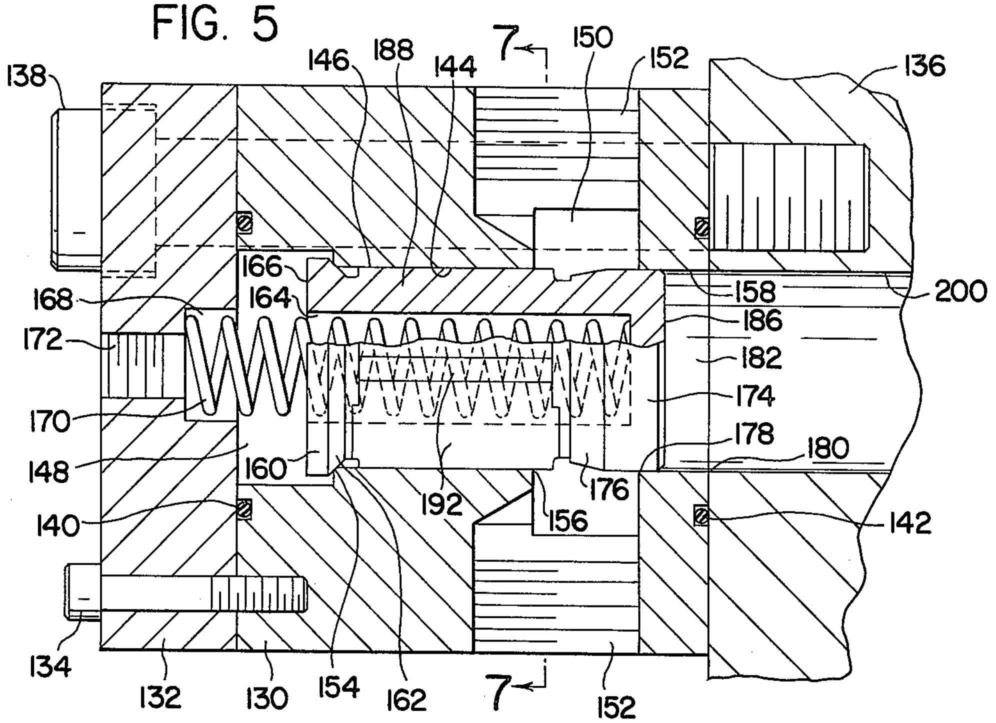
FIG. 5 is an enlarged sectional elevation view of the valve shown in FIG. 4 and showing the valve closed.

The other end of spool member 146 is provided with a valve head member including a cylindrical portion 174 and a tapered portion 176 at the axially inner end of the cylindrical portion. The outer diameter of cylindrical portion 174 provides for the latter portion to be received in cylindrical bore 158 for sliding and sealing engagement therewith. Cylindrical bore 158 intersects discharge chamber 150 along a cylindrical line 178 and intersects the outer end of body member 130 along a cylindrical line 180. The axial distance between lines 178 and 180 defines a chamber 182 which is closed with respect to discharge chamber 150 when the valve is in the closed position, as shown in FIGS. 4 and 5. Further, when the valve is closed as shown in the latter Figures, cylindrical portion 174 and cylindrical bore 158 have an axial overlap of about ⅛ inch between edge 178 and axially outer edge 184 of cylindrical portion 174. Cylindrical portion 174 includes a planar fluid pressure receiving face 186 against which fluid pressure in chamber 182 acts to bias spool member 146 to the left as seen in FIGS. 4 and 5.

In the embodiment disclosed, the intermediate portion 188 of spool member 146 is generally square in cross section, and the corners between adjacent sides thereof are rounded as at 190 to a radius corresponding to that of cylindrical wall 144. Accordingly, rounded corners 190 slidably engage cylindrical wall 144 to guide and slidably support reciprocating movement of spool member 146. Further, the areas between the flat side walls of spool portion 188 and cylindrical wall 144 define axial passages 192 for flow of fluid from chamber 148 to discharge passage 150.

As schematically shown in FIG. 4, hydraulic fluid from a source 194 is pumped to the fluid receiving chamber 136a in overload cylinder 136 through a feed line 196 having a check valve 198 therein. Chamber 182 of the relief valve communicates with chamber 136a through opening 200 thereinto, whereby fluid at system pressure fills valve chamber 182. Fluid at system pressure is delivered to valve chamber 148 through line 202, whereby spool member 146 is biased in the closing direction by fluid pressure in chamber 148 and the biasing force of spring 184.

It will be appreciated that outer face 166 of the spool member together with the axial inner end of recess 164 therein define the pressure receiving face of the spool acted against by fluid under pressure in chamber 148 and that his face has an area determined by the diameter of the radially outermost edge of valve seat surface 154. Preferably, this area is greater than the area of face 186 at the opposite end of the spool and which defines a pressure receiving face acted upon by fluid pressure in chamber 182.

In operation of the valve shown in FIGS. 4–8, the system is charged to a given pressure through the operation of pump 204 and settable system relief valve 206, whereby the pressure in chamber 136a of overload cylinder 136 and chamber 182 of the relief valve is the same as the pressure of fluid in chamber 148 of the relief valve. This pressure relationship maintains the relief valve normally closed. Upon an overload on the press, the pressure of fluid in chamber **136*a* of cylinder 136 and thus in chamber 182 of the relief valve is increased, and check valve 198 prevents transmission of fluid at the increased pressure to valve chamber 148. Accordingly, spool 146 is displaced to the left from the position shown in FIG. 5 toward that shown in FIG. 6.**

Figure 6:
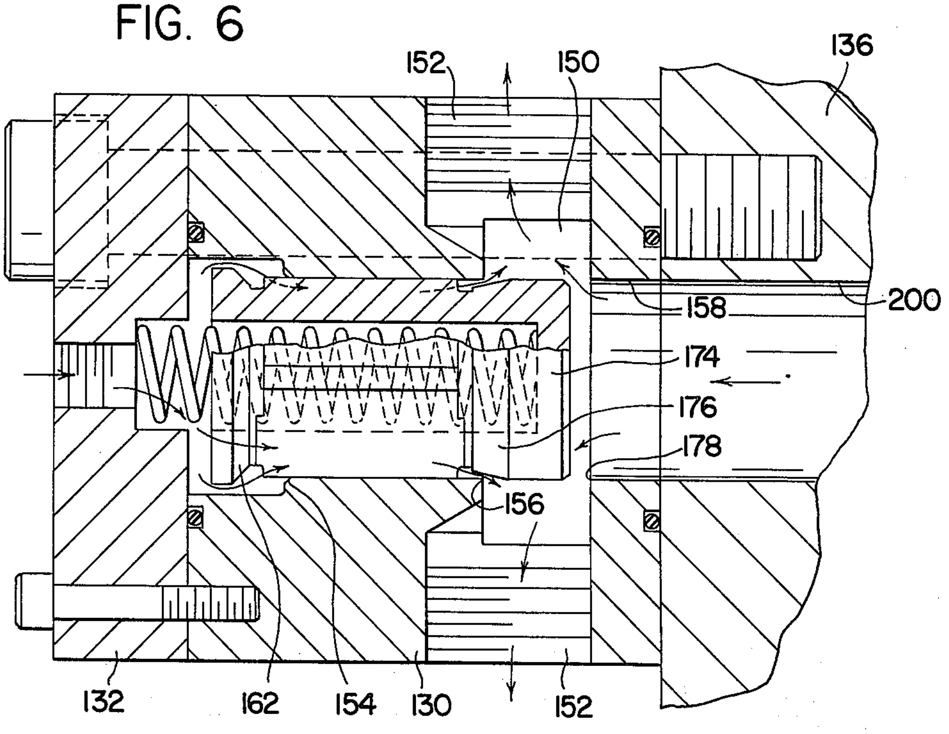
FIG. 6 is a view similar to FIG. 5 and showing the valve open.
Figure 7:
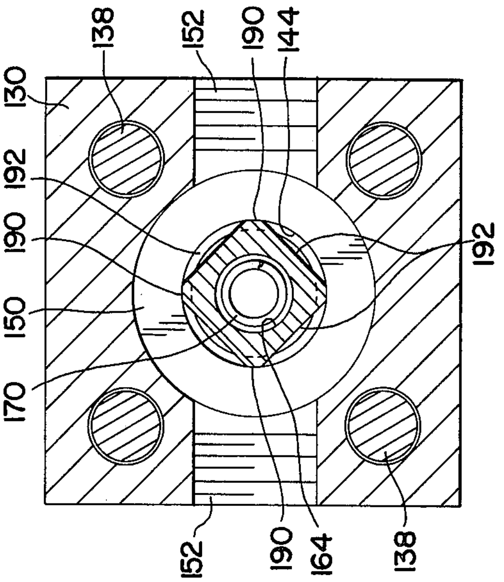
FIG. 7 is a cross-sectional view of the relief valve taken along line 7—7 in FIG. 5; and, FIG. 8 is an exploded perspective view of the components of the relief valve shown in FIGS. 4–7.
Figure 8:
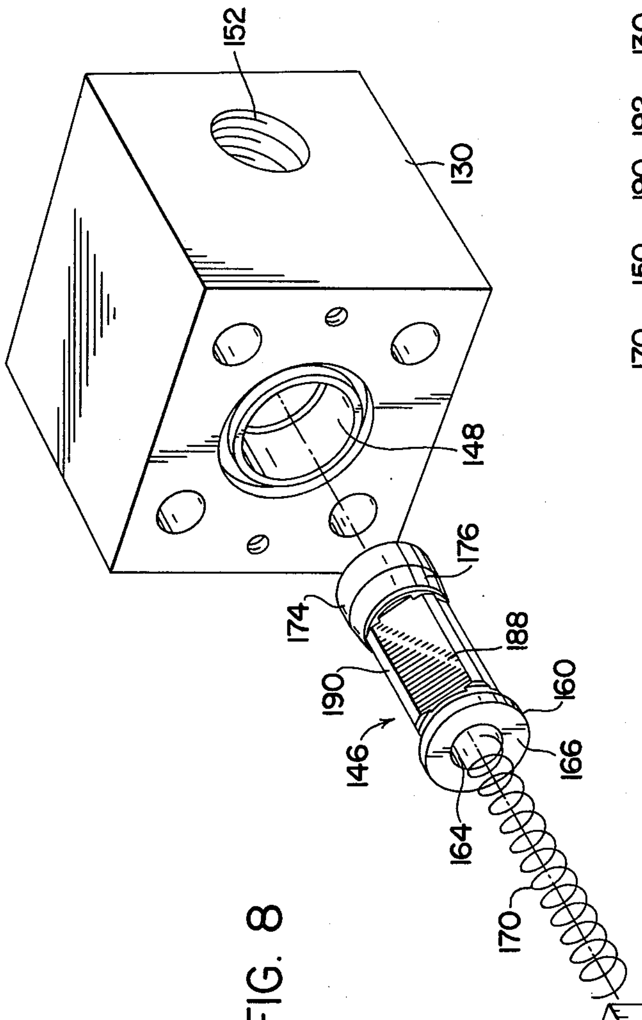
Figure 8:
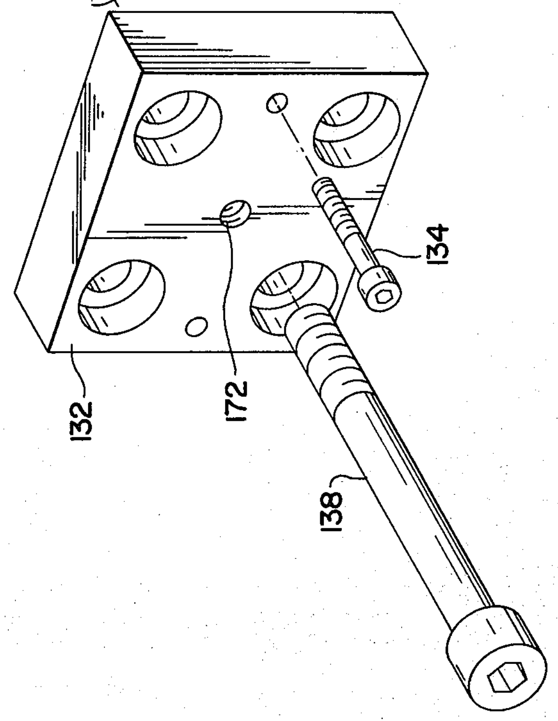

Upon movement of valve surface 162 from valve seat 154 fluid at system pressure is immediately discharged from valve chamber 148 to discharge passage 150, the flow of such discharge fluid being to the right along the intermediate portion of the spool member, as shown by arrows in FIG. 6. Just as soon as the latter discharge is initiated there is a pressure drop in chamber 148 which quickly reduces the closing bias against the spool member. Consequently, the fluid in valve chamber 182 at the pressure exceeding the given system pressure accelerates movement of spool member 146 in the opening direction, and the subsequent movement of edge 184 past edge 178 opens chamber 182 to discharge passage 150.

As mentioned hereinabove, movement of the spool member in the opening direction is accelerated by the exhaust of fluid at system pressure from chamber 148. As the spool then moves to the left toward the open position thereof shown in FIG. 6, tapered surface 176 of the spool member approaches edge 156 at the corresponding end of cylindrical passage 144. The flow of fluid to the right in FIG. 6 from chamber 148 through passages 192 along the spool impinges upon tapered surface 176 as the latter approaches edge 156. This decelerates opening movement of the spool member so as to minimize the possibility of damage to the spool member upon engagement of face 166 thereof with the inner surface of end plate member 132, and to minimize the noise of operation. The fluid discharged into passage 150 from chambers 148 and 182 is of course discharged therefrom through ports 152 for return to the fluid source such as by return lines 208 shown in FIG. 4.

By mounting the relief valve directly on the overload cylinder of the press advantage is taken of the fact that fewer flow lines are required for the necessary transmission of hydraulic fluid to the overload protection system. It will be appreciated that mounting of the relief valve in the manner shown in FIG. 4 is applicable to the embodiment of FIGS. 1–3. It will be further appreciated that in the embodiment of FIGS. 4–8 relief valve 198 could be mounted on the valve housing and connected between chambers 148 and 182 by suitable openings through the housing and would, in such construction, provide for flow of fluid from chamber 148 to chamber 182 while preventing reverse flow between the chambers. The system would then be charged from the source through chamber 148, the latter check valve arrangement to chamber 182 and thence to fluid receiving chamber **136*a* in overload cylinder 136.** It will be appreciated too that the check valve could be built into the relief valve to serve the intended function.

As many possible embodiments of the present invention can be made and as many possible modifications can be made in the embodiments herein illustrated and described, it is to be distinctly understood that the foregoing descriptive matter is to be interpreted merely as illustrative of the present invention and not as a limitation.

What is claimed is:

1. A hydraulic fluid pressure relief valve comprising a housing, a pair of fluid receiving chambers in said housing, discharge passageway means in said housing between said chambers, each of said chambers having an inlet opening and an outlet opening, said outlet openings being coaxial and in fluid flow communication with said discharge passageway means, fluid pressure actuated reciprocable valve element means coaxial with said outlet openings, said valve element means being reciprocable between first and second positions and having opposite end portions each cooperable with a corresponding one of said outlet openings in said first and second positions to respectively close and open the corresponding chamber with respect to said discharge passageway means, said valve element means being displaceable from said first position toward said second position by fluid in one of said chambers at a pressure exceeding a given pressure, said valve element means being biased toward said first position by fluid in the other chamber at said given pressure, spring means biasing said valve element means toward said first position, said end portions of said valve element means being disposed in the corresponding chamber when said valve element means is in said first position and having fluid pressure receiving end face means, the end face means of the end portion in said one chamber having a given area, the end face means of the end portion in the other of said chambers having an area at least equal to said given area, said outlet opening of said one chamber including a cylindrical wall having an axially outer edge, the corresponding end portion of said valve element means including cylindrical head means engaging an axial length of said wall from said edge when said valve element means is in said first position, said valve element means moving a given axial distance from said first toward said second position to cause said other chamber to open to said discharge passageway means through the corresponding outlet opening, said axial length being greater than said given axial distance, and said outlet opening of said other chamber including valve seat means transverse to the axis of the latter opening, the corresponding end portion of said valve element means including a surface engaging said seat means only when said valve element means is in said first position.

2. The valve according to claim 1, wherein said end face means of said end portion in said other chamber has an area greater than said given area.

3. A hydraulic fluid pressure relief valve comprising, a housing, a pair of coaxial cylindrical fluid receiving chambers in said housing, discharge passageway means in said housing between said chambers, said chambers each having an axially outer end spaced from said passageway means and an axially inner end which is cylindrical and opens into said passageway means to define an outlet from the corresponding chamber to said passageway means, a spool valve element coaxial with said chambers and reciprocable in axially opposite directions between first and second positions, said valve element having opposite ends each associated with a corresponding one of said chambers, one of said ends being cylindrical and having a peripheral surface matingly engaging the cylindrical inner end of one of said chambers to close the outlet therefrom when said spool valve element is in said first position, the other of said chambers including annular valve seat means therein transverse to the axis of the corresponding cylindrical inner end, the other of said ends of said spool valve element being in said other chamber and including a radial portion engaging said seat means to close the outlet from said other chamber when said spool valve element is in said first position, said ends of said spool valve element in said second position opening the corresponding chamber to said discharge passageway means, spring means in said other chamber biasing said valve element toward said first position, said one end of said valve element having a fluid pressure receiving face having a given area, said other end of said valve element having a fluid pressure receiving face of greater area than said given area, each of said chambers having an inlet opening to receive fluid under a given pressure whereby said valve element is normally maintained in said first position by said spring means and by fluid at said given pressure in said other chamber acting against the larger area valve element face, said peripheral surface of said one end of said valve element having an axial dimension which delays opening of said one chamber upon movement of said valve element from said first position toward said second position, said valve element being displaceable from said first toward said second position in response to fluid in said one chamber at a pressure exceeding said given pressure, and said axial dimension providing for sequential opening of said other and one chambers to first initiate discharge of fluid at said given pressure from said other chamber, whereby the fluid in said one chamber at said excess pressure thereupon accelerates displacement of said valve element toward said second position and opening of said one chamber to said discharge passageway means.

4. The valve according to claim 3, wherein said spring means includes a spring element, said spool valve element includes a spring receiving recess extending axially inwardly from said other end thereof and having an inner end wall, and said spring means has opposite ends engaging said outer end of said other chamber and said end wall of said recess.

5. The valve according to claim 3, wherein said discharge passageway means includes a passage portion coaxial with said chambers, said spool valve element includes a portion intermediate said opposite ends thereof, and guide means on said intermediate portion slidably engaging said passage portion to guide reciprocating movement of said spool valve element.

6. The valve according to claim 5, wherein said passage portion is cylindrical and said intermediate portion is polygonal in cross section and includes sides and longitudinally extending corner surfaces therebetween, said corner surfaces defining said guide means.

7. The valve according to claim 3, wherein said one end of said valve element includes an end portion spaced axially inwardly from said fluid pressure receiving face thereof, said end portion tapering axially and radially inwardly from said peripheral surface and defining an annular surface for deceleration displacement of said spool valve element following opening of said one chamber.

8. The valve according to claim 3, wherein said discharge passageway means includes an annular discharge chamber portion adjacent said axially inner end of said one chamber and having a diameter greater than the diameter of the latter inner end, said discharge passageway means further including discharge port means in said housing and leading radially from said discharge chamber portion.

9. The valve according to claim 8, wherein said one end of said valve element includes an end portion spaced axially inwardly from said fluid pressure receiving face thereof, said end portion tapering axially and radially inwardly from said peripheral surface and defining an annular surface for decelerating displacement of said spool valve element following opening of said one chamber.

10. The valve according to claim 9, wherein said discharge passageway means further includes a cylindrical passage portion between said discharge chamber portion and said axially inner end of said other chamber, said spool valve element includes a portion intermediate said opposite ends thereof and extending through said cylindrical passage portion, and said intermediate portion of said valve element includes guide surface means slidably engaging said cylindrical passage portion to guide movement of said spool valve element.

11. The valve according to claim 10, wherein said spring means includes a spring element, said spool valve element includes a spring receiving recess extending axially inwardly from said other end thereof and having an inner end wall, and said spring means has opposite ends engaging said outer end of said other chamber and said end wall of said recess.

12. A hydraulic fluid pressure relief valve comprising a housing, a pair of fluid receiving chambers in said housing, discharge passageway means in said housing for said chambers, each of said chambers having an inlet opening and an outlet opening, said outlet openings being in fluid flow communication with said discharge passageway means, fluid pressure actuated valve elements each coaxial with a corresponding one of said outlet openings, means interconnecting said valve elements for displacement simultaneously between first and second positions, each of said valve elements having an end portion cooperable with the corresponding outlet opening in said first and second positions to respectively close and open the corresponding chamber with respect to said discharge passageway means, said valve elements being displaceable from said first position toward said second position by fluid in one of said chambers at a pressure exceeding a given pressure, said valve elements being biased toward said first position by fluid in the other chamber at said given pressure, said outlet opening of said one chamber including a cylindrical wall having an axially outer edge, the end portion of the corresponding one of said valve elements including cylindrical head means engaging an axial length of said wall from said edge when said one valve element is in said first position, said one valve element moving a given axial distance from said first toward said second position to cause said other chamber to open to said discharge passageway means through the corresponding outlet opening, said axial length being greater than said given axial distance, and said outlet opening of said other chamber including valve seat means transverse to the axis of the latter opening, the end portion of the other of said valve elements including a surface engaging said seat means only when said other valve element is in said first position, whereby said outlet opening of said other chamber opens immediately upon displacement of said other valve element from said first toward said second position.

13. A hydraulic fluid pressure relief valve comprising, a housing, first and second fluid receiving chambers in said housing, discharge passageway means in said housing for said chambers, each of said chambers having an inlet opening and an outlet opening to said passageway means, said inlet and outlet openings defining a flow path through the corresponding chamber, a fluid pressure displaceable valve element closing each said outlet openings in response to fluid in said first and second chambers at generally the same given pressure, means interconnecting said valve elements for simultaneous displacement, said valve elements sequentially opening the outlet opening of said first chamber and the outlet oening of said second chamber in response to fluid in said second chamber at a pressure in excess of said given pressure whereby the higher pressure in said second chamber then accelerates displacement of the corresponding valve element to open said outlet of said second chamber, said corresponding valve element being displaceable axially of said outlet opening of said second chamber and downstream thereof to open said second chamber, said corresponding valve element having surface means facing downstream of said outlet opening of said second chamber, and said discharge passageway means including surface means cooperable with said valve element surface means to restrict fluid flow from said first chamber to said discharge passageway means to decelerate opening displacement of said valve elements following opening of said outlet opening of said second chamber.

* * * * *